United States Patent
Wang et al.

(10) Patent No.: US 9,289,969 B2
(45) Date of Patent: Mar. 22, 2016

(54) REAR PROJECTED SCREEN MATERIALS AND PROCESSES

(71) Applicant: Disney Enterprises, Inc., Burbank, CA (US)

(72) Inventors: Dolce Lin Wang, Valley Village, CA (US); Thomas F. LaDuke, Orange, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/317,678

(22) Filed: Jun. 27, 2014

(65) Prior Publication Data

US 2015/0375493 A1    Dec. 31, 2015

(51) Int. Cl.

| | |
|---|---|
| *G03B 21/62* | (2014.01) |
| *B32B 38/00* | (2006.01) |
| *C09D 11/101* | (2014.01) |
| *G03B 21/10* | (2006.01) |
| *B41J 11/00* | (2006.01) |
| *G03B 21/606* | (2014.01) |
| *B29C 51/00* | (2006.01) |
| *B41M 5/00* | (2006.01) |
| *B41M 7/00* | (2006.01) |
| *B29C 51/10* | (2006.01) |
| *G03B 21/32* | (2006.01) |
| *B41J 3/407* | (2006.01) |
| *B33Y 10/00* | (2015.01) |
| *B33Y 80/00* | (2015.01) |
| *B33Y 30/00* | (2015.01) |

(52) U.S. Cl.
CPC ............. *B32B 38/0036* (2013.01); *B29C 51/00* (2013.01); *B29C 51/10* (2013.01); *B41J 3/407* (2013.01); *B41J 11/002* (2013.01); *B41M 5/0047* (2013.01); *B41M 5/0064* (2013.01); *B41M 7/0081* (2013.01); *C09D 11/101* (2013.01); *G03B 21/10* (2013.01); *G03B 21/32* (2013.01); *G03B 21/606* (2013.01); *G03B 21/62* (2013.01); *B29C 2791/006* (2013.01); *B33Y 10/00* (2014.12); *B33Y 30/00* (2014.12); *B33Y 80/00* (2014.12)

(58) Field of Classification Search
CPC .. B29C 51/00; B29C 51/10; B29C 2791/006; G03B 21/00; G03B 21/10; G03B 21/32; G03B 21/606; G03B 21/62; G09F 19/18; B41M 5/0023; B41M 5/0047; B41M 5/0064; B41M 7/0081; B41J 11/002; B41J 3/407; C09D 11/101; B32B 38/0036
See application file for complete search history.

(56) References Cited

U.S. PATENT DOCUMENTS

| | | | |
|---|---|---|---|
| 4,978,216 A | 12/1990 | Liljegren et al. | |
| 7,427,317 B2 | 9/2008 | Sloan | |
| 8,049,960 B1 * | 11/2011 | Ligon | 359/451 |
| 8,256,904 B2 | 9/2012 | Reichow et al. | |
| 2009/0180712 A1 | 7/2009 | Pollack et al. | |
| 2012/0326356 A1 * | 12/2012 | Martin | 264/401 |

* cited by examiner

*Primary Examiner* — Blake A Tankersley
(74) *Attorney, Agent, or Firm* — Dorsey & Whitney LLP (57) ABSTRACT

Disclosed herein are materials and methods used to form a three dimensional (3D) article having a printed layer thereon. The 3D articles are capable of displaying rear projected images, effectively as a 3D "screen" for displaying an image or a movie. The 3D articles are used as standalone articles or as a portion of an animatronic figure. The articles are made by forming a substantially planar thermoformable laminate including a rear projection screen material, printing and curing a radiation curable ink onto one or both sides of the laminate, and thermoforming to impart a shape to the laminate.

8 Claims, 9 Drawing Sheets

REAR PROJECTED SCREEN MATERIALS AND PROCESSES

TECHNICAL FIELD

The disclosure relates to three-dimensional rear projected screen materials and methods of printing thereon.

BACKGROUND

Animatronics was developed by The Walt Disney Company in the 1960s. An animatronic figure is a sophisticated puppet that is animated by means of electromechanical devices. The figure can be, but is not necessarily, a humanoid figure; it can be an animal or a moving object or moving scenery. Early examples of animatronics include those observed at the 1964 Worlds Fair in the New York Hall of Presidents, and at Disneyland in California. In the Hall of Presidents, an animatronic Lincoln, with all the gestures of a statesman, delivered the Gettysburg address. Body language and facial motions were matched with the recorded speech. While computer generated imagery dominates on-screen applications, theme parks and other non-screen applications rely on animatronic figures to provide realistic portrayals of human and non-human characters, moving objects, and moving scenery.

Generation of animatronic figures requires a combination of skills such as mechanical engineering, casting, sculpting, or vacuum forming, control technologies including various wireless control technologies, electrical and electronic engineering, computer code writing, and artistic skills.

Recently, advances in the animatronic arts include the use of rear projection imaging technology. Using internal projected images, a "blank" three dimensional shape can be employed as a projection screen to project a moving image that appears more realistic than a mechanically moving shape. Thus, for example, facial expressions and the like are convincingly projected through the rear of a blank screen shaped like a face, wherein the remainder of the body moves electromechanically. Faces in particular offer a wider range of expression by using rear projected "movies" played against a screen that is a three-dimensional face shape, as compared to animatronic faces that move solely via electromechanical means to form recognizable facial expressions. Rear projection imaging technology in animatronics is described in U.S. Pat. No. 8,256,904.

The three-dimensional "blanks" required for the rear projection are labor intensive to form. Special screen materials that diffuse the light from the projected image in an even manner over a complicated three dimensional surface must be used. Such surfaces must be formed into complicated shapes without losing integrity and while maintaining uniform thickness and light diffusion properties. Finally, the shapes that are to be human or human-like faces are typically tinted in multiple areas using multiple shades in order to provide nuanced, life-like color to the projected image. Without tinting, skin colors are not realistically viewed as a projected image alone; a surface tint to "warm" the color is required. Tinting of facial skin tone is also required in order to provide a tone for the projected image that reasonably matches the tone of the non-illuminated parts of an animatronic figure, e.g. arms, neck, etc. Further, in tinting facial features the eye areas typically require a darker tint than the remainder of the skin area to provide an additional realistic 3D type appearance.

Tinting of a face is only one example of the complicated treatments a rear projected animatronic article may require. Other examples of tinting to aid in the overall appearance of a rear-projected animatronic article will be readily apparent to one of skill. While tinting is only one step in the process, it is a particularly labor intensive step because it currently must be done on the completed three-dimensional article. Thus, standard printers for example cannot be employed; rather, each animatronic article must be individually and carefully painted or airbrushed by a specialist. Even coating of e.g. skin tone is difficult using such techniques and requires a high degree of skill and is extremely labor intensive.

Previous attempts to print on a flat rear projection screen material have resulted in uneven distribution of ink colorant and/or noticeably cracked ink layer(s) upon thermoforming the screen material into a three-dimensional article. This provides a rear projected image display appearance that is completely unacceptable for animatronic figures.

While specialized printers that can apply inks to a three-dimensional surface can be developed, such printers are expensive and complicated. It would be desirable to print the screen projection materials prior to formation of the three-dimensional image, that is, on the flat rear projection substrate.

SUMMARY

Disclosed herein are methods of making three-dimensional articles, the methods including contacting a flexible thermoformable film and a flexible rear projection screen film to form a substantially planar thermoformable laminate comprising first and second major surfaces, the first major surface comprising a thermoformable film surface, the second major surface comprising a rear projection screen film surface; printing one or more inks onto at least a portion of the first major surface, second major surface, or both to form an imaged thermoformable laminate; and thermoforming the imaged thermoformable laminate to form the three-dimensional article. In some embodiments, the inks are radiation curable inks, and the method further includes irradiating the inks after printing. In some embodiments, the contacting is accomplished by a nip, and the flexible thermoformable film includes an adhesive layer disposed on a major surface thereof, wherein the adhesive layer contacts the rear projection screen film at the nip to form the laminate. In some embodiments, the printing is accomplished using an inkjet imaging device. In some embodiments, the irradiating is UV irradiating. In some embodiments, the thermoforming includes vacuum forming. In some embodiments, the printing is substantially only on the first major surface.

Also disclosed herein are methods of viewing an image, including forming a three-dimensional image as described above and further including projecting an image onto the laminate second major side and viewing the image displayed on the laminate first major side. In some embodiments, the image is a movie.

Also disclosed herein are three-dimensional articles formed by contacting a flexible thermoformable film and a flexible rear projection screen film to form a substantially planar thermoformable laminate comprising first and second major surfaces; printing one or more radiation curable inks onto at least a portion of the first major surface, second major surface, or both; irradiating the one or more radiation curable inks to form an imaged thermoformable laminate; and thermoforming the imaged thermoformable laminate to form the three-dimensional article. In some embodiments, the thermoformable laminate further includes an adhesive. In some embodiments, the radiation curable inks include at least one or more radiation curable monomers and a pigment or a dye. In some such embodiments, the radiation curable inks further include a prepolymer, a resin, or a polymer. In some embodiments, the thermoforming is carried out at a temperature between 80° C. and 180° C. and the imaged thermoformable laminate is stretched to greater than 200% in at least one portion thereof. In some embodiments, the article has no cracked or uneven imaged portions thereon detectable by the average human eye. In some embodiments, the article is incorporated within an animatronic figure. In some embodiments, the image on the imaged thermoformable laminate includes humanoid skin color, shading, or both. In some embodiments, the article is in the shape of a humanoid face, an animal face, or an anthropomorphized face.

Also disclosed herein is a system for making a three-dimensional article, the system including a flexible thermoformable film, a flexible rear projection screen film, a lamination apparatus, an inkjet printer equipped with one or more radiation curable ink compositions and one or more sources of electromagnetic radiation, a computer in digital communication with the printer; and a thermoforming apparatus. In some embodiments, the thermoformable film includes and an adhesive on one major side thereof, and the lamination apparatus includes a nip. In some embodiments, the electromagnetic irradiation source is an ultraviolet radiation source. In some embodiments, the thermoforming apparatus is a vacuum forming apparatus.

Additional advantages and novel features of the invention will be set forth in part in the description that follows, and in part will become apparent to those skilled in the art upon examination of the following, or may be learned through routine experimentation upon practice of the invention.

DETAILED DESCRIPTION

Although the present disclosure provides references to preferred embodiments, persons skilled in the art will recognize that changes may be made in form and detail without departing from the spirit and scope of the invention. Various embodiments will be described in detail with reference to the drawings, wherein like reference numerals represent like parts and assemblies throughout some of the several views. Reference to various embodiments does not limit the scope of the claims attached hereto. Additionally, any examples set forth in this specification are not intended to be limiting and merely set forth some of the many possible embodiments for the appended claims.

DEFINITIONS

As used herein, the term "film" means a substantially planar polymeric or composite polymeric material having two major parallel surfaces defining a substantially uniform thickness therebetween, the thickness being between about 12 µm and 5 mm A "composite" polymeric material is a blend, alloy, laminate, two or more of these, or another mixed construction polymeric material including at least one polymer as part of the construction.

As used herein, the term "flexible film" means a film that is sufficiently flexible that it can be provided in a roll form, wherein portions of the roll or the entire roll is capable of being subsequently unrolled for one or more uses and stretched to meet the requirements of thermoforming.

As used herein, the term "thermoformable" means processable by addition of heat, wherein processing is employed to change the shape of a polymeric material or composite polymeric material; wherein at temperatures at or below about 60° C. (140° F.) the polymeric material or composite polymeric material retains the shape imparted to it during the thermoforming.

As used herein, the term "ink" means a composition that contains a colorant and one or more compounds capable of curing with electromagnetic radiation or electron beam radiation.

As used herein, the term "cure(d)" or "radiation cure(d)" means to expose an ink to electromagnetic radiation or electron beam radiation under conditions that cause the ink to undergo a reaction such as polymerization, bonding or grafting to a polymer or a surface, crosslinking, or a combination of two or more thereof. Electromagnetic radiation includes, but is not limited to, ultraviolet (UV) radiation, microwave radiation, and gamma radiation. "Radiation polymerizable" or "radiation curable" monomers and crosslinkers are compounds that are polymerized or crosslinked as a result of interaction with electromagnetic radiation or electron beam radiation. In some embodiments, radiation curable monomers and crosslinkers are also curable by thermal means.

As used herein, the term "three-dimensional article" or "3D article" or "3D rear projected article" or "three-dimensional rear projected article" means a rigid or semi-rigid, substantially non-planar article that is capable of displaying a rear projected image. By "rigid or semi-rigid" it is meant that the article is capable of holding the substantially non-planar shape in the absence of external forces and at temperatures below about 60° C. (140° F.). In some embodiments, a 3D article is designed to be capable of incorporation as a portion of an animatronic figure.

As used herein, the term "animatronic figure" means an object capable of electromechanically controlled movement, wherein the movement is viewable by an average human eye. In some embodiments, the animatronic figure is a humanoid or animal form.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities.

As used herein, the word "substantially" modifying, for example, the type or quantity of an ingredient in a composition, a property thereof, a measurable quantity or property of a composition, image, or method of the invention or like values, and ranges thereof, employed in describing the embodiments of the disclosure, refers to variation in the type or amount of materials included in compositions, physical properties of the compositions, images formed using the compositions including physical properties of the images, or methods of using the compositions or images, that do not affect the overall properties thereof in a manner that negates an intended property. Intended properties include, solely by way of nonlimiting examples thereof, concentration, viscosity, luminosity, fluorescence, wavelength, color palette, hue, saturation, visibility, and the like. The effect on properties that are modified by "substantially" include the effects caused by any type or amount of materials in a formulation to one or more properties of a composition, a method of use, or an image, wherein the manner or degree of the effect does not negate one or more intended properties; and like proximate considerations. Where modified by the term "substantially" the claims appended hereto include equivalents to these types and amounts of materials.

Overview

The materials and methods are employed as described below to form a three dimensional (3D) article having a printed layer thereon. In some embodiments, the 3D article is, or is capable of being, a portion of an animatronic figure; in other embodiments, the 3D article stands alone as an article capable of projecting a rear projected image or series of images, such as a movie. For example, a movie advertisement in the lobby of a movie theatre can employ a 3D "poster" wherein a rear projected movie is projected onto the rear of the poster, and wherein the poster is not electromechanically controlled or moved. Such embodiments and their advantages will be readily apparent to one of skill.

The 3D articles disclosed are capable of displaying rear-projected images, effectively as a 3D "screen" for displaying an image or a movie. The method of making the 3D articles includes laminating a rear-projection screen film to a thermoformable film to form a thermoformable laminate, digitally printing an image on the thermoformable film portion of the thermoformable laminate, and thermoforming the thermoformable laminate to form a 3D article, wherein the printed thermoformable film side of the thermoformable laminate is disposed as the exterior surface of the article and the rear screen projection film is disposed as the interior surface of the article. During use, the 3D article displays a rear-projected image or set of images, such as a movie, on the exterior surface of the article when the image or movie is projected onto the interior surface of the article. The printed exterior surface affects the image quality of the displayed image, as viewed by the average human eye.

Because the thermoformable laminate is generated in film form and imaged prior to thermoforming a 3D article, a standard flatbed type printer is used to print onto the thermoformable laminate without the need to use specialized printing equipment. In some embodiments, the inks are curable inks, wherein the curable inks are cured by ultraviolet (UV) irradiation. In some embodiments, an inkjet printer is employed to form the desired image on the thermoformable film portion of the laminate.

Materials

The materials employed in forming the 3D articles include rear-projection screen films, thermoformable films, and inks.

In some embodiments, rear-projection screen films employed in in forming the animatronic articles include flexible films having a gain of about 1.5 to 1.0, for example about 1.2 to 1.0, or about 1.0. Effective viewing angle is about 120° to 360°, or about 180° to 240°. Useful rear-projection screen films include those sold by Stewart Filmscreen Corporation under the trade name AEROVIEW®, such as AEROVIEW® 100, a flexible rear-screen projection film material having a gain of 1.0, half-gain of ≥60°, minimum throw distance of 1.0 x image width, ambient light front reflectance value of 29% per foot candle, and good to excellent white field uniformity and edge blending properties. Another useful rear-projection screen film is 3M® Diffuser Film 3635-70, sold by the 3M Company of Maplewood, Minn.

The dimensions of the rear projection screen films are not particularly limited. In embodiments, the films are supplied in roll form and in widths of 12", or 36", or 60" or wider widths.

The rear projection screen film is laminated to a thermoformable film to form a thermoformable laminate. The thermoformable film is a flexible film that imparts thermoformability to the rear projection screen film, wherein 3D articles are formed by thermoforming the thermoformable laminate. Additionally, the thermoformable film serves as a printable medium, that is, the thermoformable film side of the thermoformable laminate is imaged. In some embodiments, the thermoformable films are substantially transparent to visible light and are substantially colorless. In other embodiments, the thermoformable films are diffuser films that transmit less than about 80% of projected light, for example about 10% to 75% of projected light, or about 15% to 50% of projected light, or about 20% to 40% of projected light. In some embodiments, the thermoformable films have a surface gloss of greater than about 1 Gloss Unit (G.U.) to 50 G.U., often about 2 G.U. to 40 G.U. or 5 G.U. to 30 G.U. when measured at 60° using a gloss meter.

The thermoformable films are flexible films, as that term is defined above. In many embodiments, the dimensions of the thermoformable films are selected to match those of the rear projection films at least in terms of width. While not limited in particular, in some embodiments the thickness of the thermoformable films is about 12 μm to 250 μm, or about 25 μm to 150 μm, or about 25 μm to 100 μm.

Thermoformable films useful with the present articles and methods of printing include flexible films formed from PETG (polyethylene terephthalate glycol-modified), plasticized or unplasticized poly(vinyl chloride), polycarbonates, polyacrylate ester homopolymers or copolymers such as poly (methyl methacrylate), ionomers such as polyethylene having about 10 mol % or less ionic content, blends or copolymers of these, and the like. The thermoformable film must be capable of thermoforming without incurring undue crystallization upon cooling, since crystallization affects light transmission. In some embodiments, the thermoformable film includes a filler, for example a particulate material that scatters light. For example, in some embodiments $TiO_2$ particulate is blended into a thermoformable film material in order to diffuse light or block a percentage of light transmission through the resulting film.

In some embodiments, the thermoformable film is coated with a pressure sensitive adhesive layer on one major side thereof, and the lamination is carried out by contacting the pressure sensitive adhesive layer with a major surface of a rear projection screen film to form a thermoformable laminate. In some embodiments, pressure sensitive adhesive is covered with a protective liner as supplied; in such embodiments, during lamination the liner is removed from the pressure sensitive adhesive layer, followed by contacting the pressure sensitive adhesive to the rear projection screen film. In other embodiments, the flexible thermoformable film is supplied in roll form, wherein the pressure sensitive adhesive layer contents the non-adhesive coated major side of the thermoformable film as the film is rolled up; in such embodiments, the thermoformable film is simply unwound prior to contact with the rear projection screen film.

The thickness of the pressure sensitive adhesive layer is not particularly limited; however, in many embodiments, the layer thickness is about 5 µm to 100 µm, or about 10 µm to 75 µm, or about 12 µm to 50 µm. The pressure sensitive adhesive layer thickness is substantially uniform over the coated surface. In some embodiments, the pressure sensitive adhesive is substantially transparent to visible light and is substantially colorless; in other embodiments, the pressure sensitive adhesive diffuses or partially blocks light transmission. The pressure sensitive adhesive is capable of undergoing a subsequent thermoforming step without substantial degradation, deformation, or development of color.

One type of suitable pressure sensitive adhesive coated thermoformable film is sold by the 3M Co. of Maplewood, Minn. under the trade name 3M™ Diffuser Film 3635 White. The film is a 2 mil (about 50 µm) thick white polyvinyl chloride film and is selected for one of 3 transmission levels: 30%, 50% and 60%. The film includes a pressure sensitive adhesive coated on one major side thereof. The product bulletin for the diffuser film (product olefin diffuser, release a, effective October 2012) indicates that the film is intended for adhesion to rigid substrates. In the bulletin section entitled "Limitations of End Uses," unsuitable end uses listed include "printing on the diffuser film."

In some embodiments, the thermoformable film does not include a pressure sensitive adhesive. In such embodiments, the thermoformable film is laminated to the rear projection screen film using thermal lamination techniques.

In some embodiments, after forming the thermoformable laminate it is desirable to reduce the gloss and/or reflectivity of one or both major surfaces thereof, in order to prevent interference from extraneous light refraction during the display of rear-projected images on and through the 3D articles. In such embodiments, a topcoating is applied to one or both thermoformable laminate major surfaces. Such topcoatings include, for example, DEFT® 36 series Acrylic Polyurethane enamel, sold by PPG Industries of Pittsburgh, Pa. Alternatively, a third film is laminated onto one or both sides of the thermoformable laminate, wherein the third film has the effect of reducing light refraction during the display of rear-projected images on and through the finished 3D articles. In some embodiments, the third film is a diffuser film. Diffuser films are designed to transmit a selected percentage of light. Useful diffuser films include, for example, 3M® Diffuser Film 3635-70, sold by the 3M Company of Maplewood, Minn., wherein the film has a matte finish and provides 60% light transmission. In some embodiments, the third film is also a thermoformable film.

Inks useful for imaging the thermoformable laminates include at least one colorant and one radiation curable compound. Radiation curable compounds include monomers. Useful monomers include any of the known compounds having one or more unsaturated bonds that are polymerizable by free radical polymerization methods or plasma polymerization methods such as electron beam radiation polymerization. In embodiments, useful vinyl monomers include acrylates, methacrylates, acrylamides, allylic monomers, α-olefins, butadiene, styrene and styrene derivatives, acrylonitrile, and the like. Some examples of useful monomers include acrylic acid, methacrylic acid, and alkyl esters of acrylic or methacrylic acid wherein the ester groups have between 1 and 18 carbons, in some embodiments between 1 and 8 carbons, and are linear, branched, cyclic, aryl, or aralkyl. In embodiments, blends of two or more monomers are present in the inks. In some such embodiments, one or more monomers are selected for improved wetting, adhesion, or both of the ink to the selected surface.

In some embodiments, monomers having more than one unsaturated and polymerizable bond include, for example, diacrylates such as ethylene diacrylate, hexamethylene diacrylate, and tripropyleneglycol diacrylate; triacrylates such as glycerol triacrylate and trimethylolpropane triacrylate; and tetraacrylates such as erythritol tetraacrylate and pentaerythritol tetraacrylate; divinyl benzene and derivatives thereof, and the like. Such monomers provide crosslinking during the curing reaction. Other compounds that are useful monomers where UV polymerization is employed include photoactive crosslinking agents. Photoactive crosslinking agents include, for example, benzaldehyde, acetaldehyde, anthraquinone, substituted anthraquinones, various benzophenone-type compounds and certain chromophore-substituted vinylhalomethyl-s-triazines, such as 2,4-bis(trichloromethyl)-6-p-methoxystyryl-s-triazine.

In some such embodiments, photoactive crosslinking agents or monomers having more than one unsaturated and polymerizable bond are present at less than about 10% total by weight of the ink composition, for example at about 0.1% to 5% by weight of the ink composition.

In some embodiments, the ink composition includes a tertiary amine synergist. Tertiary amines interact with the photoinitiator to form species that are highly reactive toward acrylate and methacrylate type monomers. Particularly useful in embodiments are tertiary amines having one or more acrylate or methacrylate moieties bonded thereto. The presence of these moieties causes the tertiary amine to become bonded into the cured ink network, thus preventing migration after cure. Examples of useful acrylate functional amine synergists are described, for example, in EP2550250 A2 and references cited therein. In embodiments where an acrylate functional amine synergist is included in the ink composition, it is present at about 0.1% to 7% by weight based on the total weight of the ink composition, for example about 0.5% to 5% by weight based on the total weight of the ink composition.

In embodiments, the monomer, blend of monomers, or blend thereof with a photoactive crosslinking agent and/or amine synergist is a liquid or a solution at the temperature at which the ink is printed and prior to curing.

Colorants included in the inks are dyes or pigments, without limitation. One of skill will appreciate that a vast array of colorants are available for inclusion in radiation curable inks; any such colorants are useful in the inks usefully employed herein. Where the ink is an inkjet ink and the colorant is a pigment, the particle size of the pigment must be suitable for delivery via the selected inkjet nozzle size and shape. In general, black inks are based on carbon black pigment, while white inks are based on titanium dioxide pigments. Other pigments and dyes are generally organometallic compounds. UV-A or UV-B fluorescent dyes, pigments, or both are also included in the inks, as selected by the artist. Pigments or dyes are generally present in the inks at about 0.1%-7% by weight based on the total weight of the ink, or about 0.5% to 5% by weight based on the total weight of the ink. The colorants provided in an ink array are based on CMYK or RGB type color schemes, or variations thereof as will be appreciated by one of skill. Variations include addition of orange and/or green to the CMYK ink set or addition of lower-colorant concentration inks for more nuanced skin tones.

In embodiments where curing is carried out by UV radiation, it is desirable to include a photoinitiator that will absorb the UV radiation and become activated, thereby initiating the polymerization of the unsaturated polymerizable monomer(s) and any other components of the ink that contain UV polymerizable moieties. In embodiments, the photoinitiator is selected based on the wavelength of radiation to be employed. Where a photoinitiator is employed, it is included in the inks at about 0.01% by weight to 20% by weight based on the weight of the ink, for example 1% by weight to 10% by weight based on the weight of the ink. Examples of suitable photoinitiators include those sold under the trade name IRGACURE® by Ciba Specialty Chemicals Corp. of Tarrytown, N.Y.; those sold under the trade name CHEMCURE® by Sun Chemical Company of Tokyo, Japan; and LUCIRIN® TPO sold by BASF Corporation of Charlotte, N.C.; and acylphosphine oxide compounds, such as diphenyl(2,4,6-trimethylbenzoyl)phosphine oxide.

In embodiments, one or more additional components are added to the ink composition. Adhesion promoters, natural or synthetic resins or polymers, antifouling agents, thermal or oxidative stabilizers, antimicrobial compounds, adjuvants, plasticizers, and solvents are examples of additional materials that are added to the inks in some embodiments. While minor amounts of solvents are included in some embodiments, it is an advantage of the UV curable inks employed in such embodiments that the inks are substantially solvent free. Such inks are referred to as "100% solids" inks in some embodiments, even though the inks as delivered are in liquid form. This is because after curing, the inks are solidified and have substantially no residual migratable species residing therein.

In some embodiments, an additional component is a prepolymer. Resins or other polymers differ from prepolymers in that resins and polymers are admixed with the ink composition, whereas prepolymers are polymers formed in situ during ink composition formulation. Prepolymerization is a bulk or continuous polymerization method wherein a minor amount of polymerization, for example 1% to 10%, of the bulk ink composition is carried out to achieve a target viscosity. In embodiments, the prepolymerization is accomplished using radiation polymerization. In some embodiments, the colorant is added to the ink composition after prepolymerization. In some embodiments, an additional amount of monomer(s) and photoinitiator(s) is added after prepolymerization. The prepolymers, polymers, or resins are soluble in the monomer or monomers of the ink composition. A suitable molecular weight and concentration of the prepolymers, polymers, or resins provides increased viscosity of inks which in turn allows a thicker layer to be coated than would be practicable by printing only monomeric species.

Suitable ink compositions include those described in U.S. Pat. No. 7,427,317 and other related patents; and inks available from the ROLAND® DGA Corporation of Hamamatsu, Japan and marketed under the trade name ECO-UV and ECO-UV S Inks.

Another type of ink useful in some embodiments is a solvent-based pigmented ink. Such inks do not include radiation curable components, but do include solvents as an ink carrier. Useful solvents for such inks include those that provide wetting onto the laminate surface. Thus, for example, solvents such as methyl ethyl ketone, methyl isobutyl ketone, isopropyl alcohol, isobutyl alcohol, ethyl acetate, mixtures thereof, and the like are employed. In some embodiments, a polymer is included in the ink formulation to improve the ability of the ink to elongate during thermoforming. Latex inks are also useful in some embodiments.

Methods

In some embodiments, a rear projection screen film is laminated to a thermoformable film to form a thermoformable laminate. In other embodiments, a thermoformable film is coated on one side thereof with a low gain, matte neutral coating to form the thermoformable laminate. In some embodiments, lamination of a pressure sensitive adhesive coated thermoformable film to a rear projection screen film is accomplished without addition of heat to form the thermoformable laminate, for example where the thermoformable film includes an adhesive layer on one major side thereof. In other embodiments, lamination includes contacting and addition of heat sufficient to bond the two flexible films together. In some embodiments, contacting of the two flexible films is accomplished using a nip. Equipment known to those of skill as laminators employ at least one pair of parallel cylindrical rolls that are urged towards each other with variable pressure, while counter rotating, to provide a suitable nip for laminating. In some embodiments one or both rolls are heated. In embodiments where the thermoformable film includes an adhesive layer, an operator feeds a rear projection screen film and the thermoformable film together through the nip, wherein the adhesive layer of the thermoformable film contacts the rear projection screen film at the nip. Uniform pressure across the nip ensures lamination across the width of the films, while the counter rotating action of the cylinders provides lamination across the length of the films.

Figure 1A:
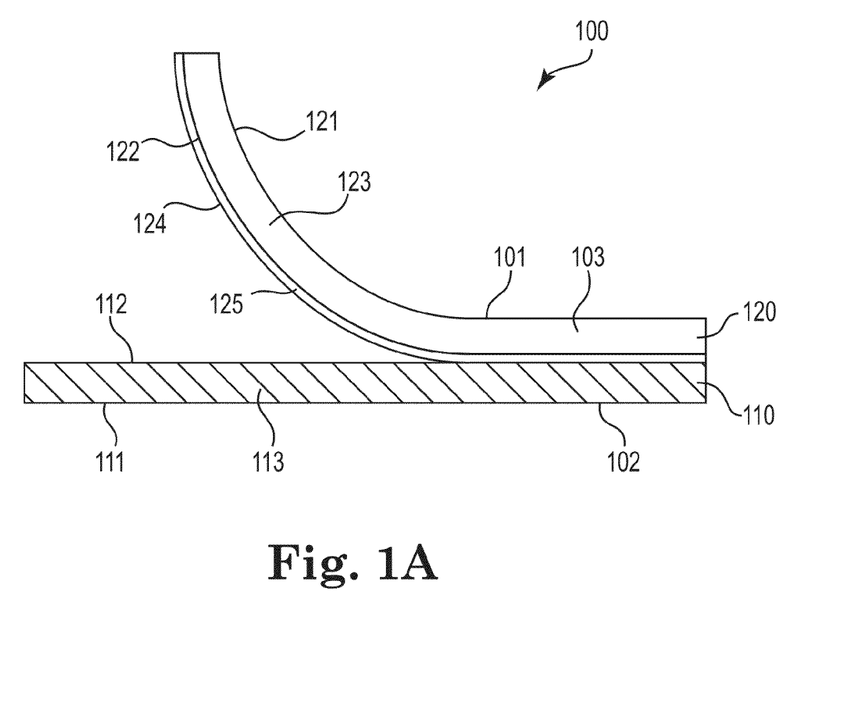
FIG. 1A is a schematic side view of a thermoformable laminate.

Referring to FIG. 1A, the formation of one embodiment of a thermoformable laminate is schematically shown from the perspective of the edge of a laminate during formation, in order to highlight certain details thereof. Thermoformable laminate 100 includes rear projection screen film 110 and thermoformable film 120. Prior to lamination, rear projection screen film 110 has first major surface 111 and second major surface 112 defining thickness 113. Prior to lamination, thermoformable film 120 has first major surface 121 and second major surface 122 defining thickness 123. Prior to lamination, thermoformable film 120 further includes adhesive layer 124 having thickness 125, disposed on a second major surface 122 of thermoformable film 120. As rear projection screen film 110 is contacted with thermoformable film 120, first major surface 121 of thermoformable film 120 becomes first major surface 101 of laminate 100; first major surface 111 of rear projection screen film 110 becomes second major surface 102 of laminate 100. Laminate 100 is characterized by total thickness 103.

In some embodiments, after forming the thermoformable laminate it is desirable to reduce the gloss and/or reflectivity of one or both major surfaces thereof, in order to prevent interference from extraneous light reflection and refraction during the display of rear-projected images on and through the 3D articles. In such embodiments, one of two approaches is suitably employed, or a combination thereof. A first approach involves coating one or both major surfaces of the laminate with a topcoat that is optically clear but has a dulling effect. Such topcoatings include, for example, DEFT® 36 series Acrylic Polyurethane enamel. The coating is suitably brushed or sprayed onto one or both major surfaces of the thermoformable laminate and dried at ambient temperature or by applying heating conditions at less than about 100° C. Such a topcoat is suitably applied to the thermoformable laminate after printing and thermoforming. In some embodiments, the topcoat is applied to the thermoformable film side only.

A second approach is to laminate a third film onto the thermoformable film side of the thermoformable laminate, wherein the third film has the effect of reducing light refraction during the display of rear-projected images on and through the finished 3D articles. In such embodiments, the third film is also a flexible film. In some embodiments, the third film is a diffuser film. Diffuser films are specifically employed to transmit only a selected percentage of light. Useful diffuser films include, for example, 3M® Diffuser Film 3635-70, sold by the 3M Company of Maplewood, Minn., wherein the film has a matte finish and provides 60% light transmission. In some embodiments where a third film is used, it is laminated only to the thermoformable film side of the thermoformable film/rear projection screen film construction. In some embodiments, the third film includes a pressure-sensitive adhesive on one major side thereof. In some embodiments, the third film is laminated to the thermoformable film contemporaneously with lamination of the thermoformable film to the rear projection screen film. In other embodiments, the three films are laminated in separate steps.

After lamination and optional topcoating or application of a third film, at least a portion of one or both major surfaces 101, 102 of the thermoformable laminate are imaged using one or more inks. In some embodiments, the inks are radiation curable inks, such as UV curable inks. In such embodiments, imaging is accomplished by printing a radiation curable ink onto one or more portions of one or both major surfaces of the thermoformable laminate, followed by irradiation to cure the ink, forming the imaged thermoformable laminate. Sources of radiation include electromagnetic radiation, such as ultraviolet (UV) radiation, or electron beam (e-beam) radiation. The printed ink reacts when exposed to the radiation, such that the ink solidifies, becomes bonded to the thermoformable laminate surface, polymerizes to form a polymeric layer or coating on the thermoformable laminate surface, crosslinks to form a crosslinked polymeric layer or coating on the thermoformable laminate surface, or a combination of two or more of these.

In some embodiments, a flatbed inkjet imaging device is usefully employed to image one or both major surfaces of the thermoformable laminates. A flatbed imaging device provides a planar path for the thermoformable laminate as it is advanced lengthwise through the device, while printheads move across the width of the thermoformable laminate and deposit droplets of ink in a selected pattern. Printing is carried out by depositing UV curable inks in liquid form onto one major surface of the thermoformable laminate, followed by irradiation to form the imaged surface. In many embodiments, the radiation source is integral with the printer device, and therefore the printer is an imaging device. In many such embodiments, ink sets are employed wherein a wavelength of radiation in the radiation source provided on the imaging device is "matched" with the photolysis activation wavelength of the photoinitiator present in the ink compositions. This ensures the efficient and rapid initiation of the reactions leading to the solidified imaged surface. In other embodiments, a printer is employed to print the ink and a separate radiation source is employed to irradiate the printed surface to form the imaged thermoformable laminate.

Figure 1B:
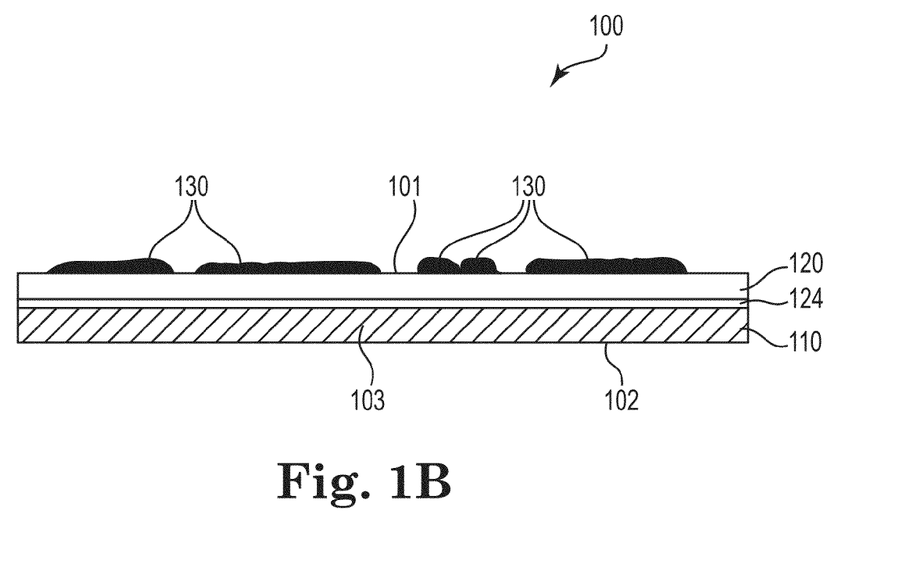
FIG. 1B is a schematic side view of an imaged thermoformable laminate.

FIG. 1B shows thermoformable laminate 100 after printing and irradiation of UV curable inks on one major side thereof. Visible on first major surface 101 are discrete imaged areas 130. In some embodiments, the entirety of first major surface 101 of laminate 100 is imaged. In some embodiments, a portion or the entirety of one or both surfaces 101, 102 are imaged. In some such embodiments, different areas of the surface(s) imaged include different imaged colors.

Inkjet printing is a type of computer printing that creates a digital image by propelling individual droplets of ink onto the target substrate. Inkjet printers are currently the most commonly used type of printer, and range from small inexpensive consumer models to very large professional machines. Inkjet printing technology includes both drop-on-demand and continuous jet technology; drop-on-demand is by far the more heavily utilized technology and is the nearly exclusive technology available in all but large commercial print shops.

Drop-on-demand printers employed to print radiation curable inks typically employ piezoelectric print heads to deliver droplets of precise volume through micron-scale nozzles to provide precise placement. In many embodiments, the print head moves along a rail, defining a first (x) axis, wherein the thermoformable laminate moves in a direction 90° to the rail movement, defining a second (y) axis. The image to be printed is encoded in a page description language, and a raster image processor converts the page description into a bitmap in the raster memory. Each horizontal strip of dots deposited across the x axis is known as a raster line.

Figure 2A:
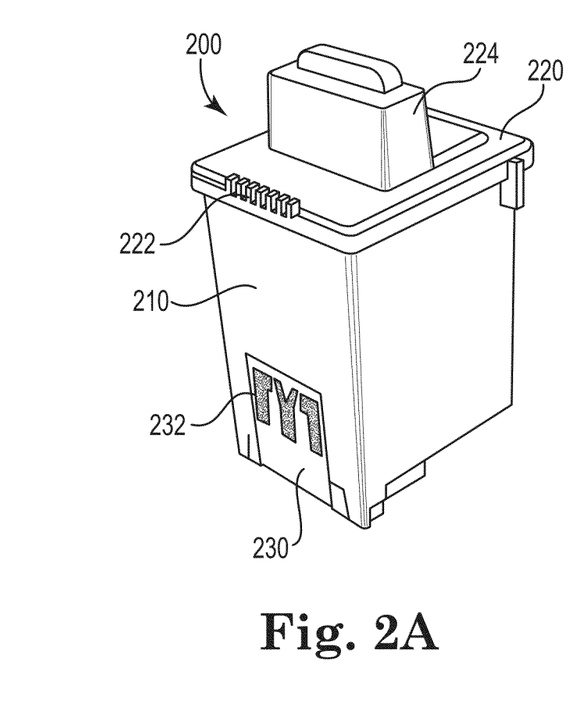
FIG. 2A is a schematic view of an inkjet printing cartridge.
Figure 2B:
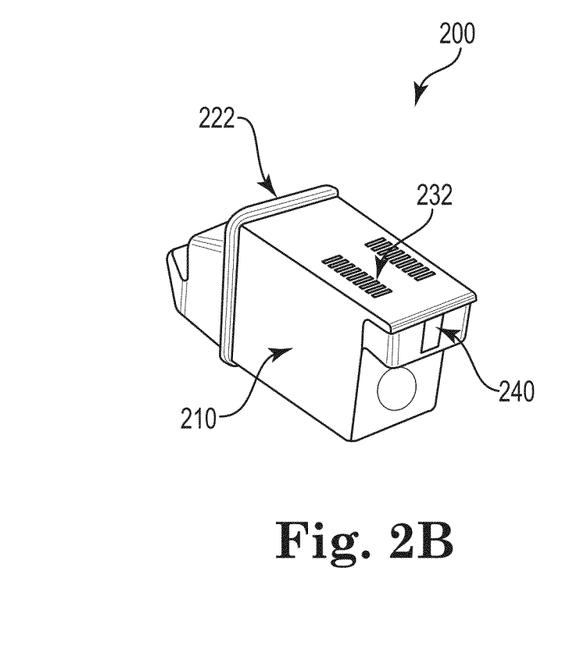
FIG. 2B is a different schematic view of the inkjet printing cartridge.
Figure 3:
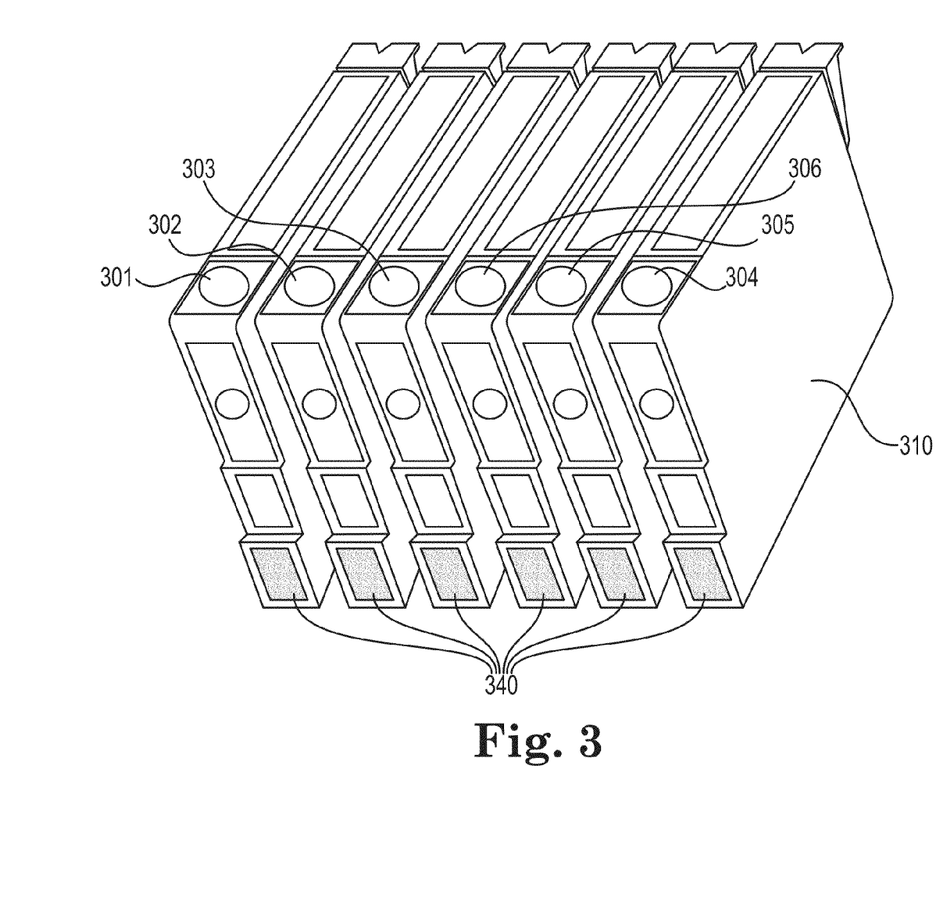
FIG. 3 is a schematic view of an array of inkjet printing cartridges.

Some drop-on-demand inks are supplied in individual cartridges with small (less than 100 mL) amounts of ink in each cartridge. An example of an individual inkjet cartridge is shown in FIGS. 2A and 2B. Cartridge 200 of FIG. 2A includes a tank area 210 for holding an ink composition, a lid 220 including bracket 222 and attachment means 224, both adapted for affixing the cartridge to the reception area of a printer designed to hold the cartridge, and flex tape 230 bearing copper contacts 232 for providing electrical contact with the printer. FIG. 2B shows cartridge 200 turned on its side to show nozzles 240 for jetting the ink. FIG. 3 shows an array 300 of cartridges 301, 302, 303, 304 305, 306, each having a tank 310 and nozzle area 340. The cartridges 301-306 each have a different ink formulation and are mounted in array 300 on a single drop-on-demand inkjet printer. Cartridges 301, 302, 303, 304 305, 306 contain UV curable inkjet inks, wherein each cartridge contains an ink having a different colorant. Cartridge 301 contains a pigmented UV curable cyan ink; cartridge 302 contains a pigmented UV curable yellow ink; cartridge 303 contains a pigmented UV curable magenta ink; cartridge 304 contains a pigmented UV curable black ink; cartridge 305 contains a pigmented UV curable white ink; cartridge 306 contains a UV curable clear ink for adjustment of gloss e.g. on otherwise non-imaged portions of a thermoformable laminate. Other arrays of cartridges having more or less total cartridges for use in conjunction with a single inkjet printer are envisioned.

Other drop-on-demand printers, particularly large scale and commercial printers, employ bulk ink tanks connected to a print head instead of individual use cartridges such as those shown in FIGS. 2A, 2B, and 3, wherein the bulk ink is replenished by refilling the bulk tanks. Continuous inkjet printing employs a constant stream of ink droplets that circulate within the printer, wherein individual droplets are redirected from the main stream and onto a substrate by electrostatic deflection.

Figure 4:
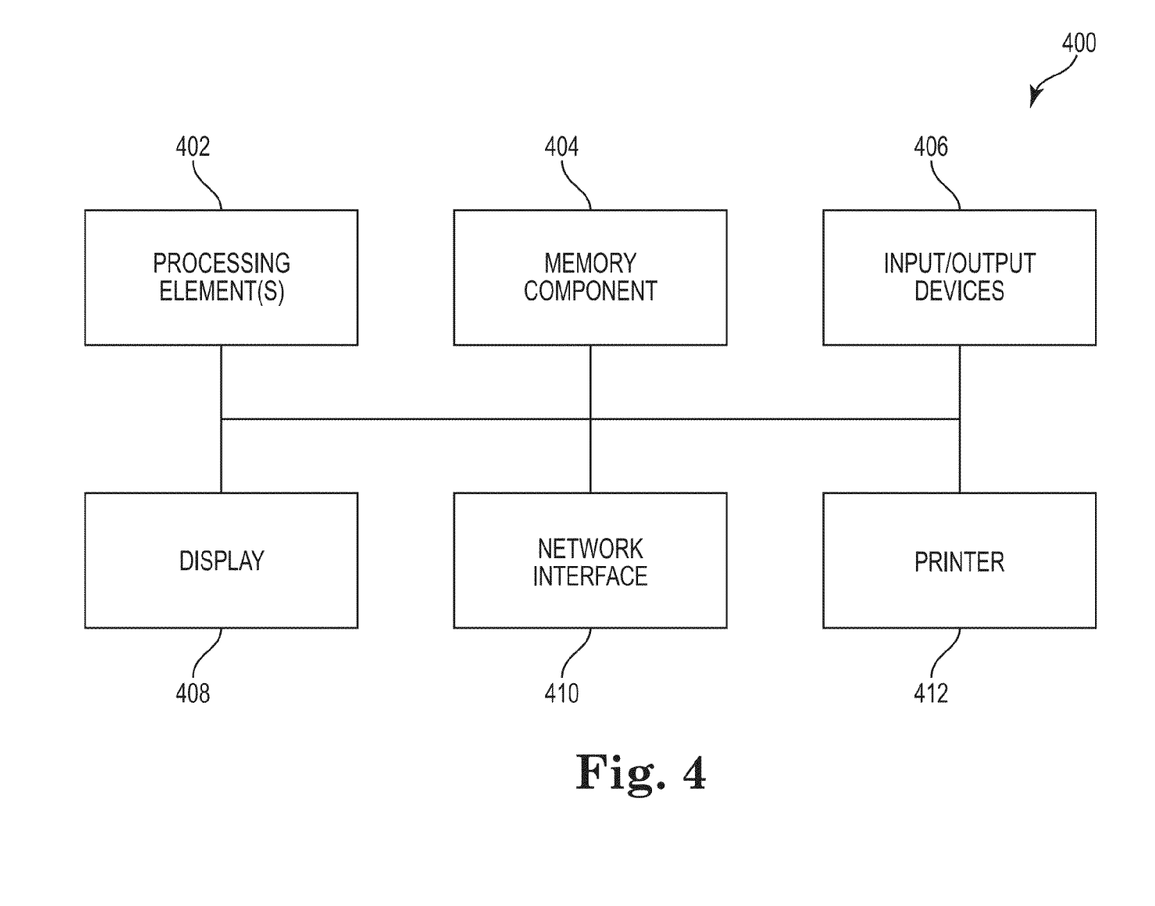
FIG. 4 is a simplified block diagram of a computer in communication with a printer or imaging device.

One of more of the printer or imaging device examples described herein may be in communication with one or more computers. FIG. 4 is a simplified block diagram of a computing device that may be used in conjunction with the one or more printers described herein. With reference to FIG. 4, a computer 400 may include one or more processing elements 402, one or more memory components 404, one or more input/output devices 406, a display 408, and/or a network interface 410. Each of the elements of the computer 400 may be in communication with one another or may be in communication with select elements, such as the processing element 402, and not in communication with other elements.

Additionally, the computer 400 may be integrated with select components and may be physically separated from others but be in communication therewith through a network (e.g., WiFi, Internet, Bluetooth, Ethernet, Universal Serial Bus, or the like) or other communication mechanism. For example, the display 408 may be physically separated from the computer 400 but be in communication with the processing elements 402 and other components of the computer 400. Similarly, the computer 400 may be in communication with the printer 412, which may be similar to the printers or imaging devices disclosed herein.

With continued reference to FIG. 4, the one or more processing elements 402 may be substantially any device capable of processing, receiving, and/or transmitting instructions. For example, the one or more processing elements 402 may be a microprocessor or microcomputer. Additionally, it should be noted that in some embodiments select components of the computer 400 may be controlled by a first processor and other components of the computer 400 may be controlled by a second processor where the first and second processors may or may not be in communication with one another.

The one or more memory components 404 store electronic data that may be utilized by the computer 400. For example, the memory component 404 may store electrical data or content, such as or one or more audio files, video files, document files, and so on, corresponding to various applications. The memory component 404 may be, for example, non-volatile storage, a magnetic storage medium, optical storage medium, read only memory, random access memory, erasable programmable memory, or flash memory.

The network interface 410 facilities communication between the computer 400, one or more printers 412, as well as other electronic or non-electronic devices (e.g., other computers, a radiation source, and the like). For example, the network interface 410 may receive data from one or more electronic components or devices, as well as facilitate transmission of data to one or more electronic components or devices. The network interface 410 may be used to receive data from a network, or may be used to send and transmit electronic signals via a wireless or wired connection (Internet, WiFi, Bluetooth, and Ethernet being a few examples). In some embodiments the network interface 410 may support multiple network or communication mechanisms. For example, the network interface 410 may pair with another device over a Bluetooth network to transfer signals to the other device while simultaneously receiving data from a WiFi or other network.

The display 408 may be integrated with the computer 400, such as a tablet computer, or may be separate from the computer 400, such as a stand-alone monitor. The display 408 displays one or more output images and/or videos and is used to provide output to a user. The display 408 may be substantially any type of display screen such as a liquid crystal display, plasma display, light emitting diode screen, or the like. Additionally, in some embodiments the display 408 may include one or more input components. For example, the display 408 may include one or more sensors to detect input signals as a user touches the display 408 either through a finger or an input device such as a stylus.

The input/output devices 406 are used to provide input to the computer 400. For example, the input/output devices 406 may include a keyboard, a mouse, a joystick, stylus, track pad, handheld controller, or the like. Additionally, the input/output devices 406 may include one or more sensors, such as image sensors, capacitive sensors, or the like. The input/output devices 406 are in communication with the display 408 and the processing elements 402 and enable a user to provide input to the computer 400.

Imaged thermoformable laminates are thermoformed to result in a finished 3D article. Thermoforming includes techniques such as thermal molding, blow molding, vacuum forming ("vacuforming"), or a combination of such techniques. The shape imparted by thermoforming is retained after cooling the 3D article to about 60° C. or below. In some embodiments, the shape is retained at higher temperatures, for example as high as 100° C. or higher. However, for practical use the 3D article will retain its shape at or below about 60° C.

Thermoforming includes any method whereby the substantially planar imaged thermoformable laminates are heated and molded to form a three-dimensional shape. In embodiments, the thermoforming is vacuforming, that is, thermoforming further employing a vacuum to conform the thermoformable laminate to a selected shape that is provided as a tool. Methods and apparatuses employed for vacuforming the 3D shapes include those described in U.S. Pat. No. 8,256,904 which is incorporated by reference herein in its entirety for all purposes related to this disclosure. The thermoformable films and laminates are capable of undergoing thermoforming at temperatures of less than about 200° C., for example about 80° C. to 180° C., or about 90° C. to 170° C.

The thermoformable laminate softens at the thermoforming temperatures but does not flow appreciably. The inks present on the surface of the thermoformable laminate are also heated and are caused to stretch along with the laminate during thermoforming. In embodiments, the printed thermoformable laminate is heated while stretching portions thereof up to 600%. The amount of stretching varies depending on the shape of the 3D article to be formed and the particular area of the 3D article shape addressed. Thus, in some embodiments, one area of the laminate is stretched 0%, another area 100%, yet another area 300%, and yet another area 600%; and other combinations without limitation between 0% and 600%. Thus, in some embodiments a full range of stretching of the printed laminate between 0% and 600% is achieved. Thus, the key limitations of thermoforming include the ability of the laminate to stretch while still providing a uniform appearance during rear-projection of images through the 3D articles, and the ability of the printed inks to stretch and maintain a uniform printed appearance consistent with the intended image.

It is an advantage of the printed laminates described herein that the printed laminates are capable of stretching greater than 200%, for example up to about 300%, or up to about about 400%, or up to about 500%, or even up to about 600% without loss of visual quality of a viewed image upon rear projection of images thereon. By "without loss of visual quality" it is meant that substantially no cracked or uneven imaged portions thereon are detectable by the average human eye, in particular during projection of a rear-projected image. It is an advantage of the printed laminates described herein that the printed laminates are capable of stretching greater than 200% during the heating process, for example heating to at least 80° C. and as high as 180° C., without loss of visual quality.

In thermoforming the 3D articles, the second major surface of the thermoformable laminate, that is, the surface including the rear projection screen material, becomes the interior of the 3D article and the first major surface of the thermoformable laminate, that is, the surface including the thermoformable film material, becomes the exterior of the 3D article. The interior surface is the surface onto which a rear projected image is projected. The exterior surface is the surface actually viewable by the viewer during use. The 3D article interior surface, exterior surface, both surfaces, or a portion of one or both surfaces are imaged.

Figure 1C:
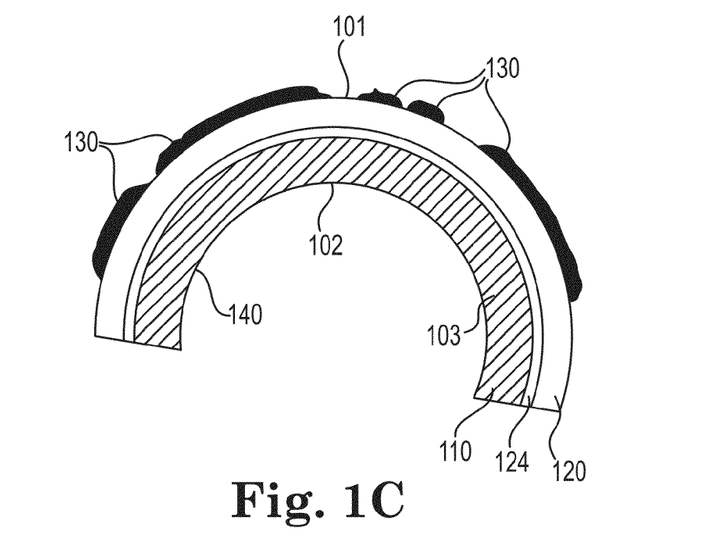
FIG. 1C is a schematic side view of a 3D article.

FIG. 1C shows a 3D article formed by vacuforming imaged thermoformable laminate 100. Imaged thermoformable laminate 100 is vacuformed by contacting second major surface 102 with a vacuforming tool having a curved shape 140, and heating the thermoformable laminate 100 while applying a vacuum across the tool. Thus, upon sufficient heating, thermoformable laminate 100 softens and conforms to shape 140 such that upon cooling, the shape 140 is retained by thermoformable laminate 100 after it is removed from the vacuforming tool. Visible on first major surface 101 are discrete imaged areas 130. The images areas 130 are retained in substantially intact form compared to the imaged areas 130 prior to vacuforming; that is, no cracks or uneven distribution of images areas 130 are observed after vacuforming and cooling. In some embodiments, the entirety of first major surface 101 of laminate 100 is imaged.

Figure 5:
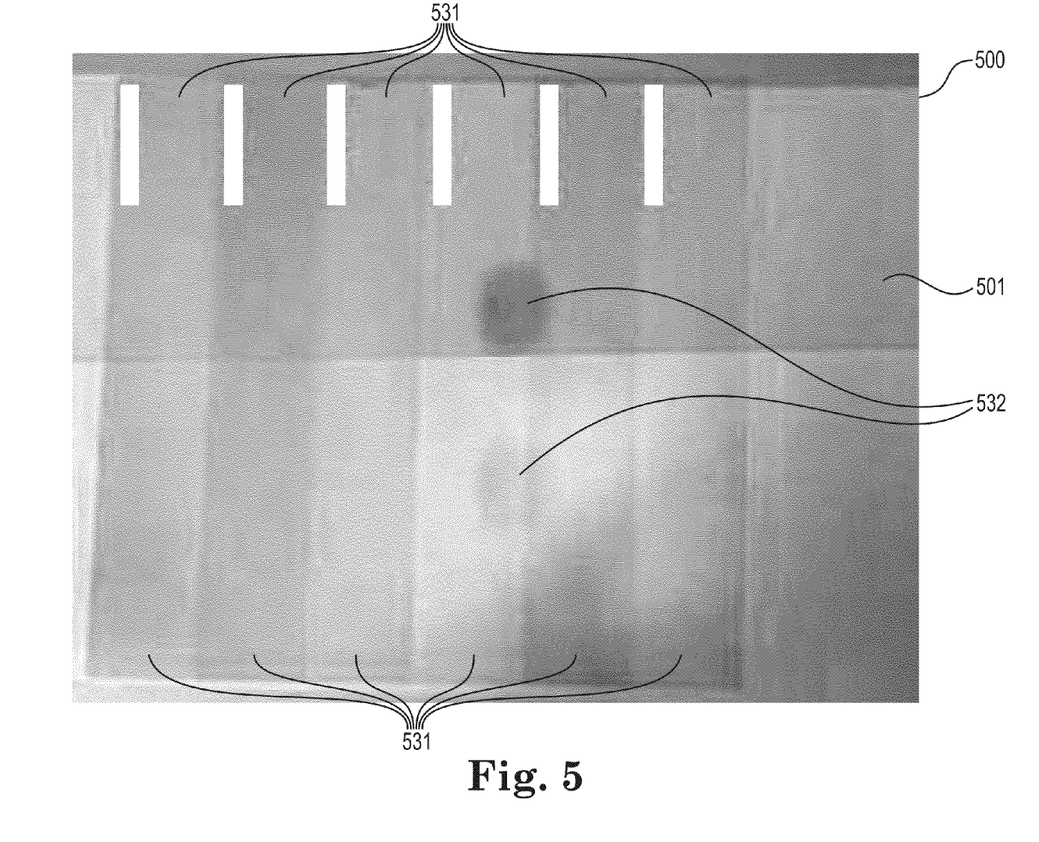
FIG. 5 is a picture of an imaged thermoformable laminate.

FIG. 5 is a view of another thermoformable laminate 500 first surface 501, wherein imaged areas 531 are varying skin colors and imaged areas 532 are darkened or shaded areas intended to be eye socket areas on a thermoformed human face. Thermoformable laminate 500 is the same or different from thermoformable laminate 100 of FIGS. 1A, 1B, and 1C.

Figure 6:
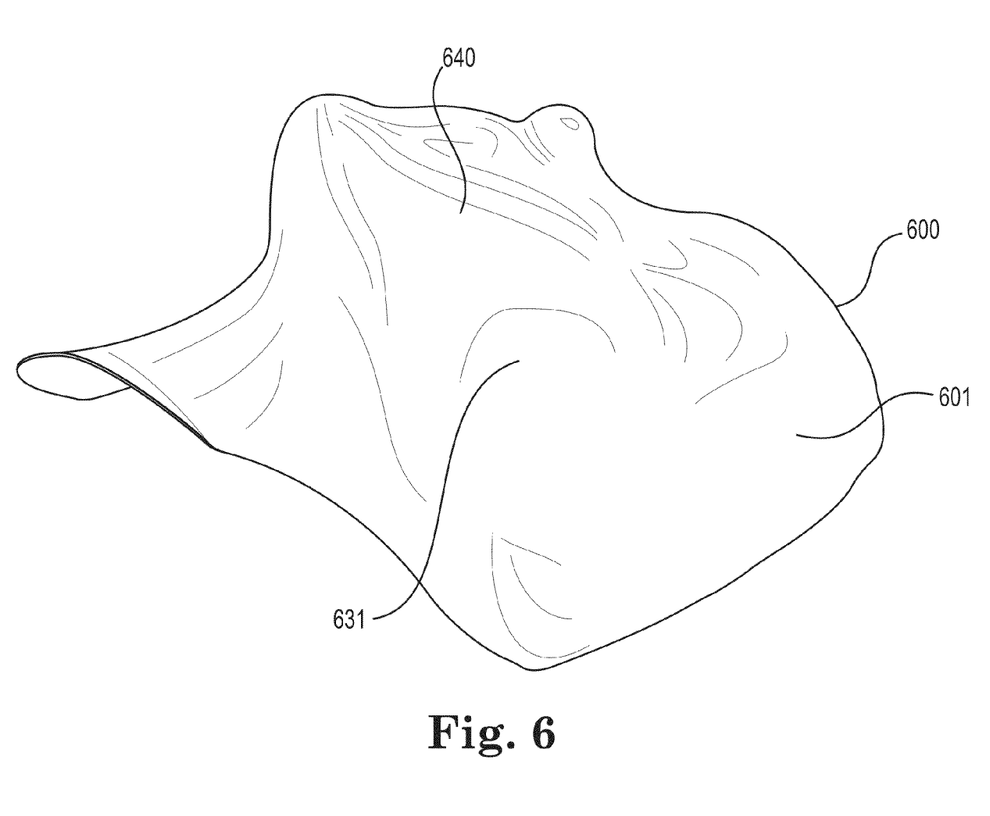
FIG. 6 is a picture of a three-dimensional article.

FIG. 6 is a side view of a 3D article 600 formed by vacuforming an imaged thermoformable laminate to a tool having a shape 640 of a human face, wherein first portion 631 of laminate first surface 601 is imaged with a skin color. The thermoformable laminate used to make 3D article 600 is the same as, or different from, thermoformable laminate 100 of FIGS. 1A, 1B, and 1C and thermoformable laminate 500 of FIG. 5.

Figure 7:
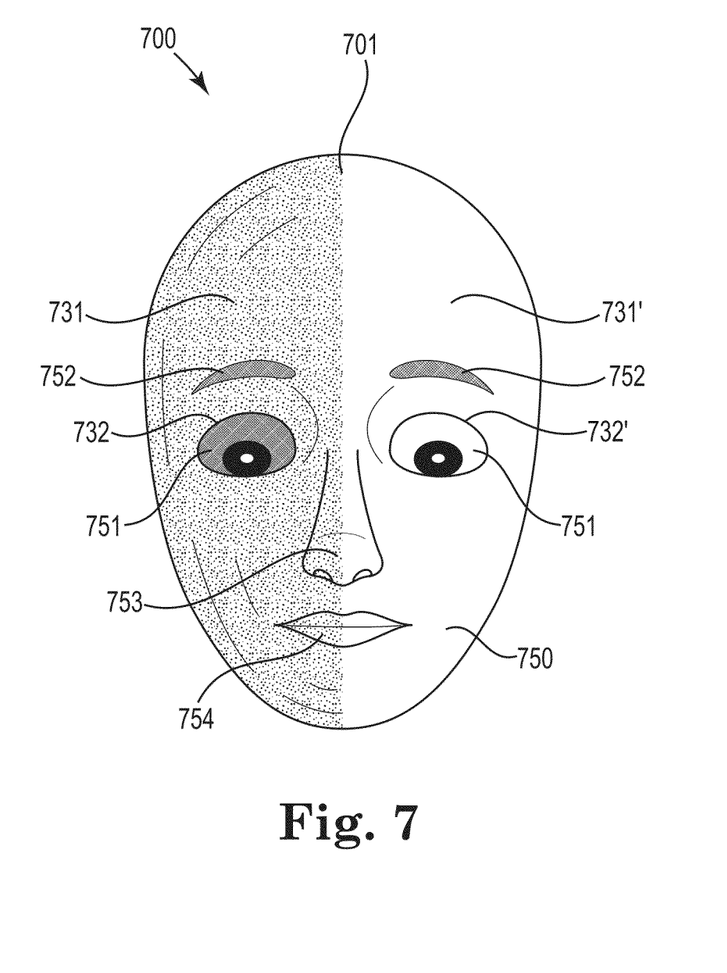
FIG. 7 is a picture of a three-dimensional article having a rear projected image projected thereon.

FIG. 7 is a view of a 3D article 700 formed by vacuforming an imaged thermoformable laminate to a tool having a shape 740 of a human face, wherein a first portion 731 of laminate first surface 701 is imaged with a first skin color, a second portion 731' of laminate first surface 701 is imaged with a second skin color, a third portion 732 of laminate first surface 701 is imaged with a first shaded eye socket color, and a fourth portion 732' of laminate first surface 701 is imaged with a second shaded eye socket color. The thermoformable laminate used to make 3D article 700 is the same as, or different from, thermoformable laminate 100 of FIGS. 1A, 1B, and 1C, thermoformable laminate 500 of FIG. 5, and the thermoformable laminate used to make 3D article 600. The 3D article 700 is vacuformed using the same tool having a shape 640 of a human face, or a tool having the shape of a different human face.

FIG. 7 is further illuminated by a rear projected image 750. The image projected onto the second major surface (not visible in FIG. 7) includes humanoid facial features: eyes 751, eyebrows 752, nose 753, and mouth 754. The impact of the variable skin tones 731, 731' and eye socket colors 732, 732' are evident when viewed in conjunction with the rear projected image of facial features 750.

Three-Dimensional Articles

As mentioned above, humanoid faces are not the only types of 3D articles that are advantageously formed using the disclosed materials and methods. The types of 3D shapes that are suitably generated for rear projection of images and movies are not particularly limited except as to the imagination of the artist. Animatronic faces, special effects, props, scenery, and components of large displays for commercial or entertainment purposes are all applications for the 3D articles described herein.

Examples of 3D articles bearing shapes for rear projection of images and movies includes animal faces, objects such as e.g. vehicles with turning wheels, rivers with flowing water, a sky with moving clouds, or rotating planets, and anthropomorphized objects such as animated books, candelabras, and the like bearing humanoid faces are suitably the subject of 3D article shapes.

In some embodiments, the 3D articles are standalone 3D "screens" for rear projection of images or movies. For example, a spherical 3D article (or sphere portion) is useful as a standalone 3D article for rear projection of an image of the Earth, wherein moving images projected thereon depict the rotating planet with clouds moving across the surface. A cylindrical, curved, wavy, or other 3D article is useful as a standalone 3D article for rear projection of poster or advertisement information, for example notifying the public of one or more venues, new movie releases, goods for purchase, and the like. In any of these embodiments, subtle shading such shown in the examples above, or stark features such as an imaged "frame" around the top and bottom of a cylindrical advertising screen, are easily incorporated onto the 3D article by printing either on the first, exterior side thereof or the second, interior side thereof to achieve the desired visual effect.

In other embodiments, one or more 3D articles are incorporated into an animatronic figure. The face shown in FIG. 7, for example, is suitably mounted on an animatronic humanoid body, and surrounded by features such as hair, wherein the rear projected image is a movie of facial expressions: smiling, frowning, laughing, crying, anger, puzzlement, and the like. Together with synchronized electromechanical movement of the body and an audio soundtrack, a highly realistic humanoid figure effect is achieved. Other uses for the 3D articles and rear projected images are easily envisioned by one of skill.

Prior efforts to print on the thermoformable laminates using any standardized printing methods have failed due to lack of compatibility of the inks with the imaged surfaces, failure of the inks to elongate during thermoforming, resulting in cracking and separation of pigments from one another.

Figure 8:
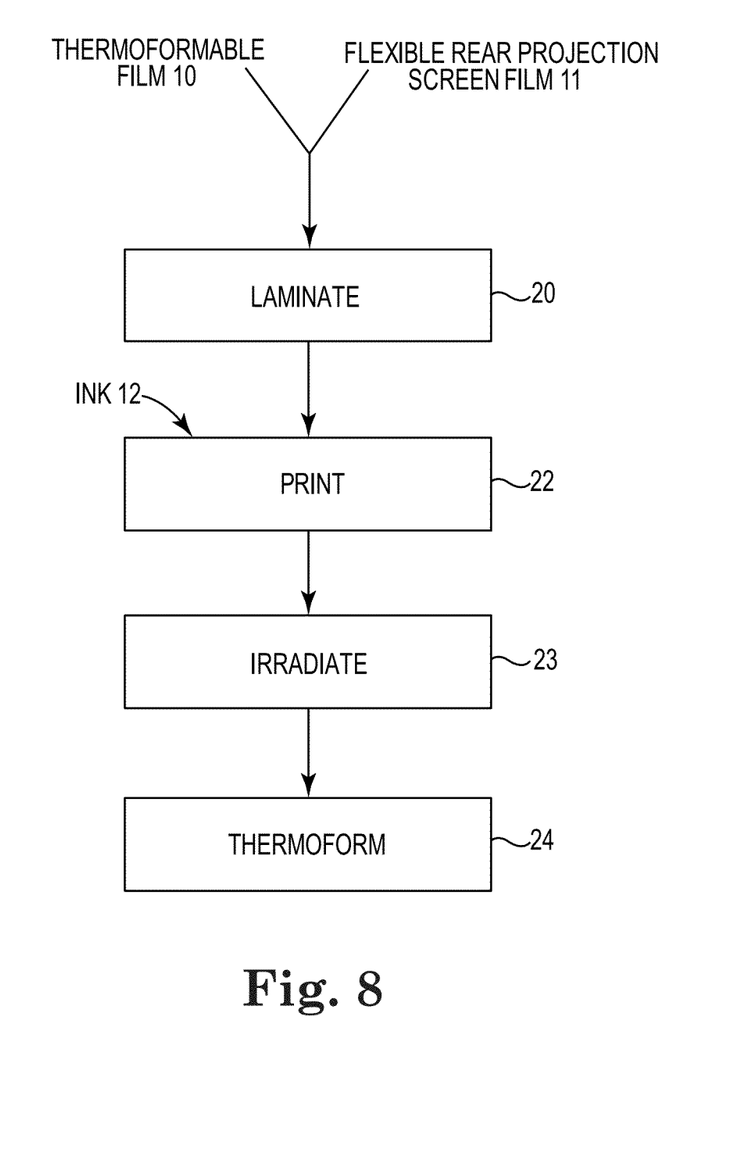
FIG. 8 is a schematic view of one method leading to a three-dimensional article.

The methods of the invention advantageously lead to the 3D articles with excellent visual quality. FIG. 8 is a schematic view of one method leading to a 3D article. Thermoformable film 10 and flexible rear projection film 11 are laminated 20; then ink 12 is applied by printing 22; the printed ink is irradiated 23; then the printed irradiated laminate is thermoformed 24. It is an advantage that the methodology is simple and easily implemented as is evident by viewing the method depicted in FIG. 8.

The materials and methods employed in forming the 3D articles are highly advantageous in a number of ways.

First, the ability to provide nuanced coloration and shading to the 3D articles in a highly uniform manner imparted by the ability to use digital imaging techniques provides previously unachievable visual quality in the rear projected images. The levels of contrast, color, clarity, and uniformity provided by the imaging methods described herein are achieved for the first time on a 3D article. Uniformity in wide-angle viewing of a surface is also improved over previously employed methods of imaging the 3D articles, and illuminated "hot spots" are eliminated by providing uniformity of image color across the selected 3D article or portion thereof.

Second, the ability to generate 3D articles that are digitally imaged prior to thermoforming is material, labor and time saving, since previously such imaging was done by hand, e.g. via airbrushing. Since artist mistakes are eliminated, less waste of materials is realized. Efficiency in the method of making the 3D articles is markedly improved.

Third, the ability to form a consistent quality 3D article means that when an article needs to be replaced, or a number of identical articles need to be generated, very nearly identical articles can be generated quickly. Prior replacement or multiple item efforts by hand meant that variability was a constant problem, exacerbated by the need to use different artists for different projects. Uniformity in appearance of copyrighted character faces, for example, is an important aspect of branding. Using the materials and methods set forth herein, a series of nearly identical faces of a single character are easily formed and uniform appearance is achieved.

Fourth, the ability to digitally image the substantially planar thermoformable laminates provides an easily achieved way of providing a more realistic, nuanced rear projected image, and allows easy matching of colors in an illuminated 3D article to be matched to animatronic counterparts wherein color matching is critical to a realistic or convincing appearance.

Fifth, UV curable inks provide improved longevity over the previous airbrushed imaging methodology. Airbrushed images are easily scratched or otherwise physically damaged. Since the UV cured inks are polymerized and typically crosslinked in situ, they are less susceptible to physical damage.

Sixth, the UV curable inks useful in conjunction with the imaging methods disclosed can be standard commercial UV curable inks; specialized ink compositions are not required. Further, standard printers or imaging devices are usefully employed to image the substantially planar thermoformable laminate: while printing or imaging on a 3D article is possible in principle, in truth the high complex printing device that would be required to form a uniform image on such 3D articles would likely require custom building; if multiple printers or imaging devices are required, cost would likely be prohibited.

Seventh, the imaging is suitably carried out on either major surface of the thermoformable laminates; this is despite product literature indicating that some of the selected materials are not intended for and/or should not be used for imaging, or that the materials should not be elongated more than a few percent up to e.g. 200%. Using the imaging methods and materials set forth here, elongation—further while heating to 80° C. or higher—of greater than 200% is easily achieved, and in some embodiments up to 600% or higher is achieved without loss of visual quality in subsequently viewing rear-projected images.

The imaged thermoformable laminates, 3D articles, and the methods of forming the laminates and 3D articles, as variously disclosed herein may be suitably practiced in the absence of any element which is not specifically disclosed herein, and is susceptible to various modifications and alternative forms. Specifics thereof have been described in detail. It should be understood, however, that the disclosures herein are not limited to the particular embodiments described. On the contrary, the intention is to cover modifications, equivalents, and alternatives falling within the spirit and scope as described. In various embodiments, the invention suitably comprises, consists essentially of, or consists of the elements described herein and claimed according to the claims.

What is claimed is:

1. A method of making a three-dimensional article, the method comprising
    contacting a flexible thermoformable film and a flexible rear projection screen film to form a substantially planar thermoformable laminate comprising first and second major surfaces, the first major surface comprising a thermoformable film surface, the second major surface comprising a rear projection screen film surface;
    printing one or more radiation curable inks onto at least a portion of the first major surface, second major surface, or both;
    irradiating the one or more radiation curable inks to form an imaged thermoformable laminate; and
    thermoforming the imaged thermoformable laminate to form the three-dimensional article.

2. The method of claim 1 wherein the contacting is accomplished by a nip, and the flexible thermoformable film includes an adhesive layer disposed on a major surface thereof, wherein the adhesive layer contacts the rear projection screen film at the nip to form the laminate.

3. The method of claim 1 wherein the printing is accomplished using an inkjet imaging device.

4. The method of claim 1 wherein the irradiating is UV irradiating.

5. The method of claim 1 wherein the thermoforming includes vacuum forming.

6. The method of claim 1 wherein the printing is substantially only on the first major surface.

7. A method of viewing an image, comprising the method of claim 1 and further comprising projecting an image onto the laminate second major side and viewing the image displayed on the laminate first major side.

8. The method of claim 7 wherein the image is a movie.

* * * * *